US 8,222,855 B2

(12) United States Patent
El-Antably et al.

(10) Patent No.: US 8,222,855 B2
(45) Date of Patent: Jul. 17, 2012

(54) SYSTEM AND METHOD FOR NON-SINUSOIDAL CURRENT WAVEFORM EXCITATION OF ELECTRICAL MACHINES

(75) Inventors: Ahmed Mostafa El-Antably, Indianapolis, IN (US); Ayman Mohamed Fawzi El-Refaie, Niskayuna, NY (US); Robert Dean King, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 376 days.

(21) Appl. No.: 12/549,437

(22) Filed: Aug. 28, 2009

(65) Prior Publication Data

US 2011/0050151 A1    Mar. 3, 2011

(51) Int. Cl.
*H02P 6/10* (2006.01)
(52) U.S. Cl. ........ 318/717; 318/565; 318/711; 318/712; 318/713; 318/714
(58) Field of Classification Search .................. 318/717, 318/565, 711–716
See application file for complete search history.

(56) References Cited

U.S. PATENT DOCUMENTS

| | | | |
|---|---|---|---|
| 4,066,938 A | 1/1978 | Turnbull | |
| 4,112,339 A | 9/1978 | Lipo | |
| 4,137,489 A | 1/1979 | Lipo | |
| 5,272,429 A * | 12/1993 | Lipo et al. | 318/808 |
| 6,262,550 B1 | 7/2001 | Kliman et al. | |
| 6,498,451 B1 * | 12/2002 | Boules et al. | 318/661 |
| 7,151,354 B2 * | 12/2006 | Yoshinaga et al. | 318/611 |
| 7,348,705 B2 * | 3/2008 | Cai et al. | 310/184 |

* cited by examiner

*Primary Examiner* — Bentsu Ro
*Assistant Examiner* — David Luo
(74) *Attorney, Agent, or Firm* — Ziolkowski Patent Solutions Group, SC; Jean K. Testa (57) ABSTRACT

A system and method for exciting an electrical machine with instantaneous non-sinusoidal current waveforms is disclosed. The system includes an inverter that controls current flow and terminal voltages in an electrical machine. The controller is further programmed to receive feedback on an air gap magnetic field in the electrical machine generated by an initial sinusoidal current demand, generate a non-sinusoidal current demand based on received air gap magnetic field feedback, and input the non-sinusoidal current demand to the inverter, thereby causing the inverter to output a non-sinusoidal current.

25 Claims, 5 Drawing Sheets

SYSTEM AND METHOD FOR NON-SINUSOIDAL CURRENT WAVEFORM EXCITATION OF ELECTRICAL MACHINES

BACKGROUND OF THE INVENTION

The invention relates generally to electrical machines and, more particularly, to a control scheme for exciting an electrical machine with instantaneous non-sinusoidal current waveforms.

The usage of electrical machines in various industries has continued to become more prevalent in numerous industrial, commercial, and transportation industries over time. There has been tremendous progress and great achievements in the field of power electronics and control techniques for such electrical machines, resulting in increased energy savings and control flexibility. Providing for such achievements has been the continued progress in computer technology that has resulted from digital technology. Digital technology has lead to very significant reductions in the size and cost of computers, allowing them to successfully replace old, bulky, and relatively expensive mechanical systems.

Figure 1A:
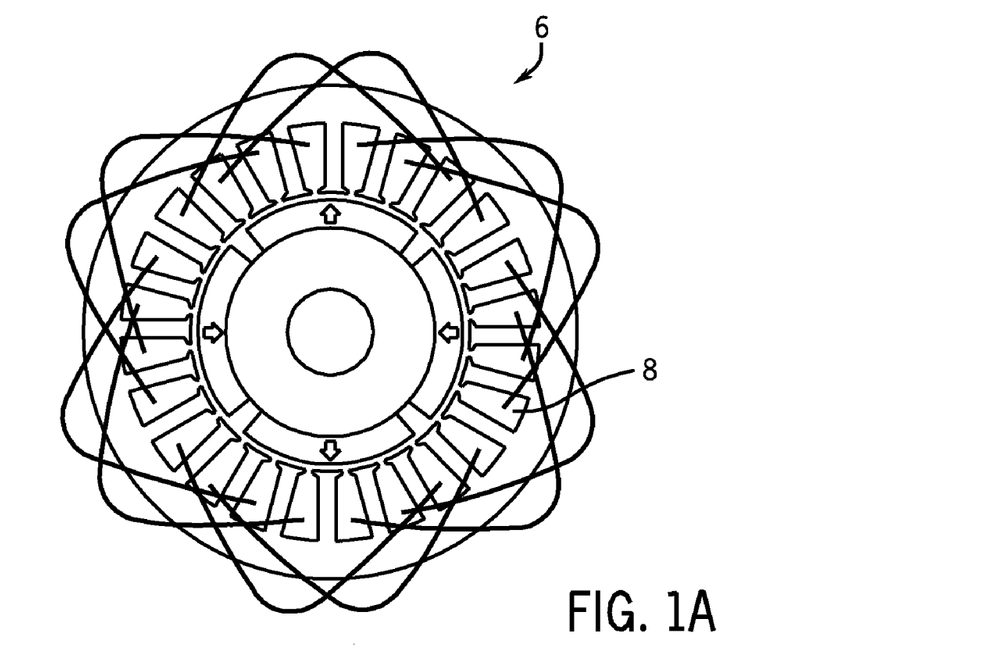
FIGS. 1A and 1B are schematic diagrams of prior art stator winding configurations for an AC motor.
Figure 1B:
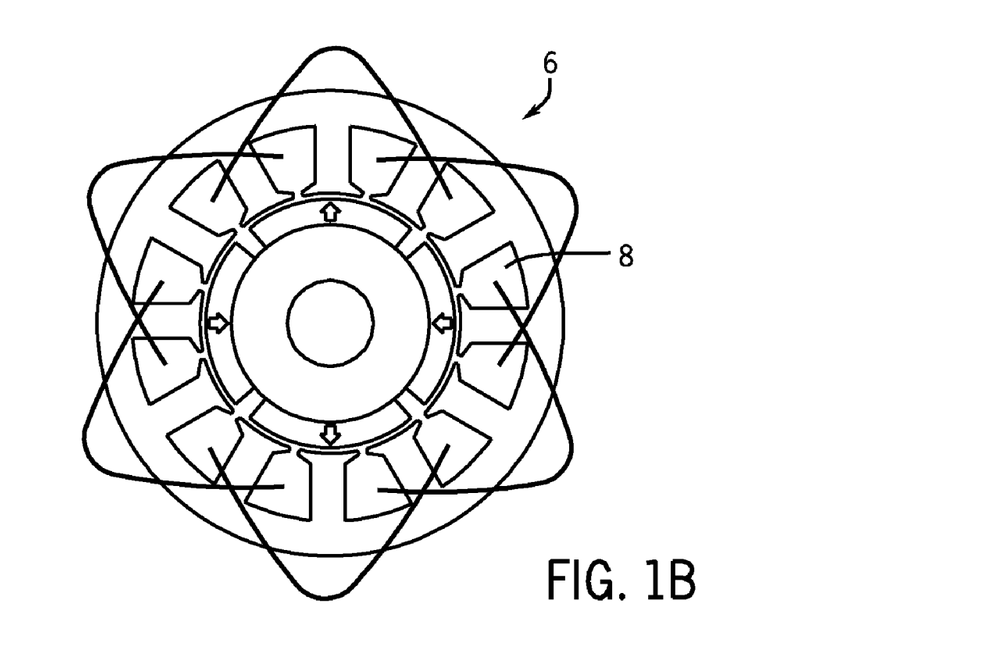

While the capability of digitally enhanced control systems and computers has progressed, the structure of the electrical machines used with such control systems has, for the most part, remained unchanged. As shown in FIGS. 1A and 1B, for example, prior art electrical machines 6 used today across the board in many fields, especially for hybrid applications, are equipped with integral-slot distributed windings 8 that produce a fairly sinusoidal rotating field in the air gap when excited by AC currents. FIG. 1A illustrates a 24-slot, overlapping distributed arrangement of windings 8, while FIG. 1B illustrates a 12-slot, overlapping concentrated arrangement of windings 8 as such configurations are known in the art. These integral-slot distributed windings that are still in use are designed for the ideal sinusoidal wave forms based on earlier machines designed a century ago for use with 60 Hz mains supply. The inverters in existing electrical machines that are used to feed these windings with sinusoidal current wave forms are thus designed using pulse width modulation (PWM) techniques. These PWM techniques use very high frequency carrier signals, resulting in high switching losses in the inverter devices, as well as significant reduction in the life of the stator insulation system of the electrical machine.

With specific reference to the use of electrical machines for hybrid applications, which have tight packaging constraints, the need to obtain high power density machines necessitates running these machines at high speeds. This requires high fundamental excitation frequencies, which generates high frequency harmonics resulting in large eddy current losses in the stator laminations. In order to reduce these losses, designers have to use thin laminations, which can be prohibitively expensive.

In order to overcome the drawbacks associated with conventional electrical machine designs, designs have been developed with alternate winding configurations. Fractional-slot concentrated windings (sometimes referred to as tooth windings), for example, have been developed as an alternative configuration (see FIGS. 3A and 3B, for example). Such windings are simpler, easier to manufacture, less expensive, and help improve the machine power density. However, tooth windings introduce increased levels of space harmonics that produce non-sinusoidal rotating fields in the machine air gap. These non-sinusoidal fields generate losses in both the stator and the rotor and hence reduce the machine efficiency.

Therefore, it would be desirable to design an electrical machine that can directly accept non sinusoidal current wave forms while maintaining high power density and high efficiency. It is further desired that a control scheme be provided for controlling the machines that suppresses the effect of the additional harmonic components typically associated with tooth windings.

BRIEF DESCRIPTION OF THE INVENTION

The invention is a directed method and apparatus for exciting an electrical machine with instantaneous non-sinusoidal current waveforms.

In accordance with one aspect of the invention, a motor drive is provided having an input connectable to a power source and an output connectable to an input terminal of an electrical machine having a plurality of fractional-slot concentrated windings. The motor drive includes an inverter having a plurality of switches therein to control current flow and terminal voltages in the electrical machine and a controller connected to the inverter and programmed to input an initial sinusoidal current demand to the inverter, thereby causing the inverter to output an initial sinusoidal input current. The controller is also programmed to receive feedback on an air gap magnetic field in the electrical machine generated by the initial sinusoidal current demand, determine an instantaneous fundamental component and instantaneous harmonic components of the air gap magnetic field, and apply a correction to the instantaneous fundamental component of the air gap magnetic field to generate an ideal fundamental component. The controller is further programmed to generate a non-sinusoidal current demand based on the ideal fundamental component and input the non-sinusoidal current demand to the inverter, thereby causing the inverter to output a non-sinusoidal current.

In accordance with another aspect of the invention, a method for exciting an electrical machine having a plurality of fractional-slot concentrated windings is provided. The method includes the steps of inputting a test sinusoidal current demand to an inverter and generating an initial sinusoidal current waveform in the inverter in response to the test sinusoidal current demand, the initial sinusoidal current waveform being output to the electrical machine to generate a rotating magnetic field between a rotor and a stator included therein. The method also includes the steps of determining a fundamental component and harmonic components of the rotating magnetic field, determining an ideal fundamental component for the air rotating magnetic field from the test sinusoidal current demand and the fundamental component, and determining a desired current waveform based on the ideal fundamental component. The method further includes the steps of generating a non-sinusoidal current demand based on the desired current waveform and inputting the non-sinusoidal current demand to the inverter, thereby causing the inverter to output a non-sinusoidal current waveform to the electrical machine to generate a sinusoidal rotating magnetic field.

In accordance with yet another aspect of the invention, a motor drive controller for applying current commands to an inverter to control current flow and terminal voltages in an electrical machine is provided. The motor drive controller is configured to input an initial sinusoidal current demand to the inverter, thereby causing the inverter to output an initial sinusoidal input current. The motor drive controller is also configured to receive an input signal including data on an instantaneous rotating magnetic field generated in the electrical machine responsive to the initial sinusoidal current demand, determine an instantaneous fundamental component and instantaneous harmonic components of the instantaneous rotating magnetic field, and identify an ideal fundamental component for the rotating magnetic field based on the initial sinusoidal current demand and the instantaneous fundamental component. The motor drive controller is further configured to generate an instantaneous non-sinusoidal current demand based on the ideal fundamental component and input the instantaneous non-sinusoidal current demand to the inverter, thereby causing the inverter to output a non-sinusoidal current that causes the electrical machine to generate a rotating magnetic field having the ideal fundamental component.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION OF THE PREFERRED EMBODIMENT

Embodiments of the invention are directed to systems and methods for exciting an electrical machine with instantaneous non-sinusoidal current waveforms. A control scheme is implemented that processes an initial sinusoidal current command applied to the inverter in order to generate instantaneous non-sinusoidal current commands that will produce rotating air gap fields with only fundamental components and eliminate all field harmonics, thus resulting in the best energy conversion from the stator to the rotor, i.e. high torque at high efficiency.

Figure 2:
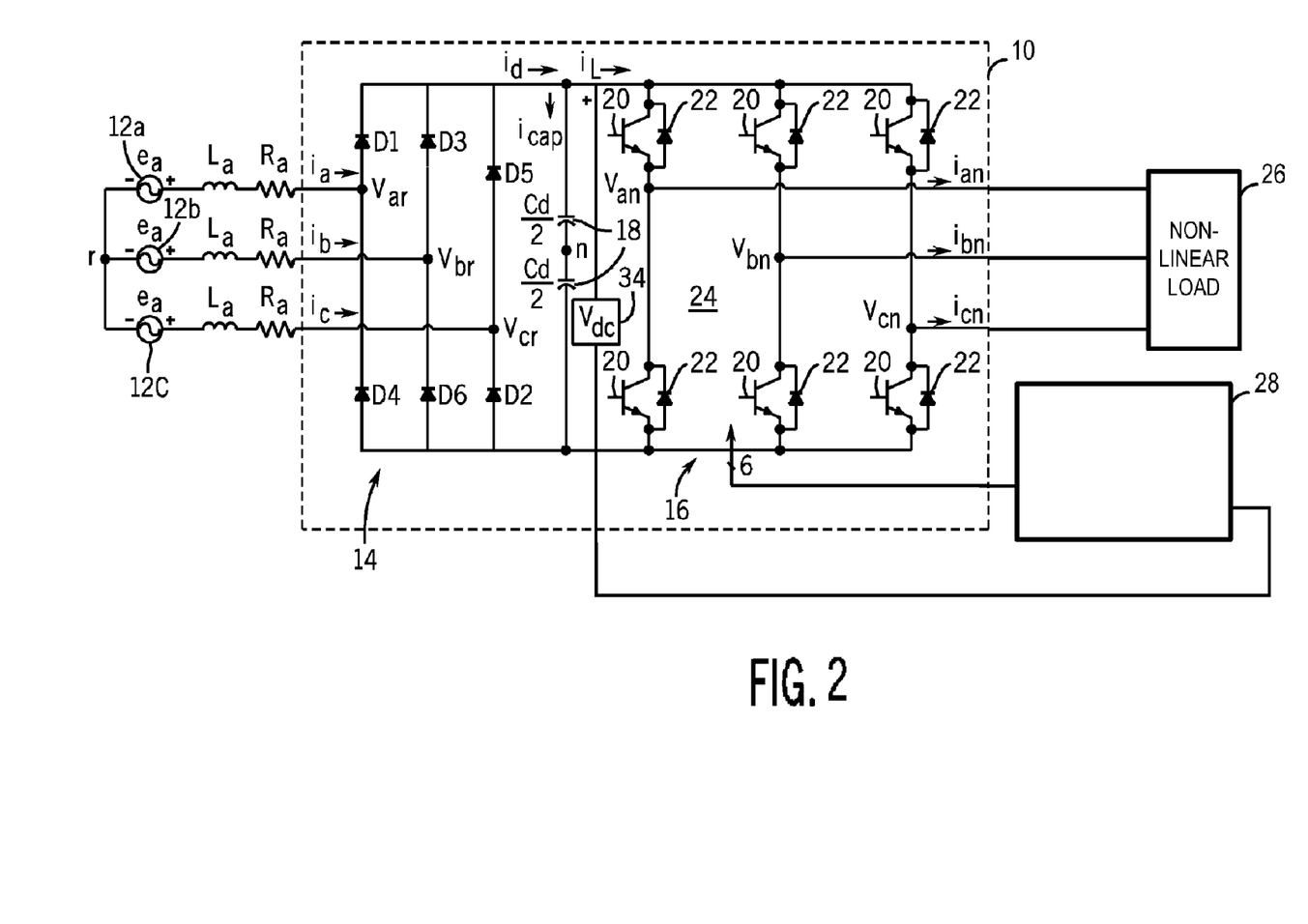
FIG. 2 a schematic of an AC motor drive according to an embodiment of the invention.

Embodiments of the invention are directed to motor drives encompassing a plurality of structures and to a control scheme for operating the motor drives. The general structure of an AC motor drive 10 is shown in FIG. 2 according to one embodiment of the invention. The motor drive 10 may be configured, for example, as an adjustable speed drive (ASD) designed to receive a three phase AC power input, rectify the AC input, and perform a DC/AC conversion of the rectified segment into a three-phase alternating voltage of variable frequency and amplitude that is supplied to a load. According to alternate embodiments, it is recognized that motor drive 10 may be designed to receive a DC power input and perform a DC/AC conversion of the DC power into a three-phase alternating voltage of variable frequency and amplitude that is supplied to a load. In a preferred embodiment, the ASD operates according to an exemplary volts-per-hertz characteristic. In this regard, the motor drive provides voltage regulation of ±1% in steady state with less than 3% total harmonic distortion, ±0.1 Hz in output frequency, and fast dynamic step load response over a full load range.

In an exemplary embodiment, a three-phase AC input 12a-12c is fed to a three-phase rectifier bridge 14. The input line impedances are equal in all three phases. The rectifier bridge 14 converts the AC power input to a DC power such that a DC bus voltage is present between the rectifier bridge 14 and a switch array 16. The bus voltage is smoothed by a DC bus capacitor bank 18. The switch array 16 is comprised of a series of IGBT switches 20 and anti-parallel diodes 22 that collectively form an inverter 24. The inverter 24 synthesizes AC voltage waveforms for delivery to a load, such as an AC motor 26 according to current demands generated by a motor drive controller 28, as will be explained in greater detail below. The controller 28 interfaces to the inverter 24 via current demand signals and sensing of the DC bus voltage and pole currents (by way a voltage sensor 34 for example) such that changes in DC bus voltage can be sensed. These voltage changes can be interpreted as transient load conditions and are used in the generation/input of instantaneous current demands to inverter 24, such that near steady-state load conditions are maintained.

Figure 3A:
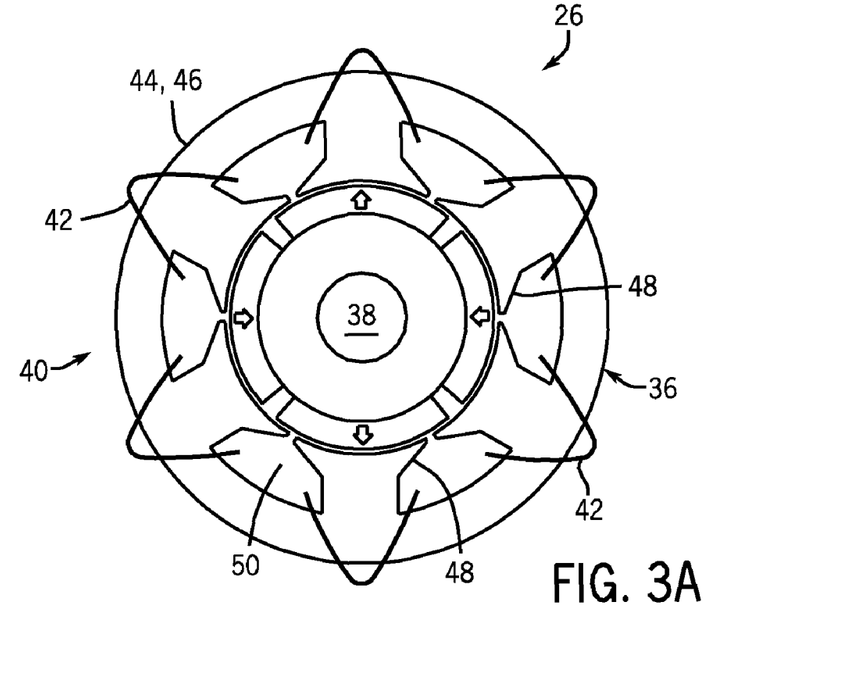
FIGS. 3A and 3B are schematic diagrams of stator winding configurations for an AC motor according to embodiments of the invention.
Figure 3B:
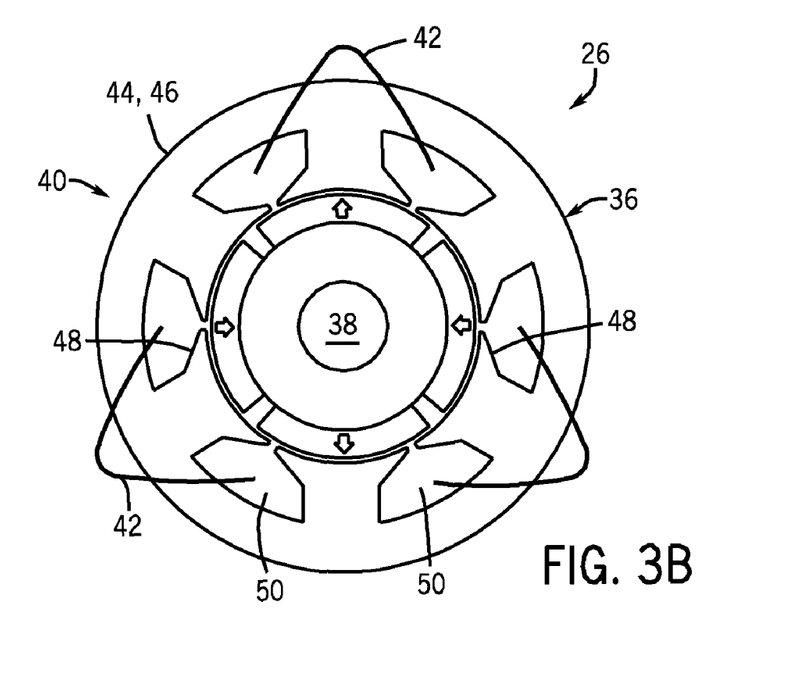

According to embodiments of the invention, load 26 is in the form of an electrical machine, such as an electric motor or a generator having a known construction, as shown in FIGS. 3A and 3B. It is recognized that the electrical machine 26 may be in the form of any of a permanent magnet machine, an induction machine, a synchronous reluctance machine, and a switched reluctance machine. As shown in FIGS. 3A and 3B, electrical machine 26 includes therein a stator 36 and a rotor 38 which is rotatably fitted in the stator 36. The stator 36 has a stator core 40 and windings 42 wound on the stator core 40. The stator core 40 has a core main body 44 formed by stacking a large number of annular-shaped thin plates made of electromagnetic steel and insulators (insulating members) 46 provided on axial end surfaces of the core main body 44. The stator core 40 is provided with a plurality of teeth 48 at a predetermined pitch along a circumferential direction thereof. According to an exemplary embodiment, windings 42 are wound on the respective teeth 48, and thus are in the form of fractional-slot concentrated windings or "tooth windings." Slots 50 are formed between adjacent teeth 48 along the circumferential direction. As shown in FIG. 3A, one embodiment of stator 36 includes six slots 50, with non-overlapping windings 42 wound about all teeth 48, according to an embodiment of the invention. As shown in FIG. 3B, another embodiment of stator 36 includes six slots 50, with non-overlapping windings 42 wound about alternate teeth 48, according to another embodiment of the invention. It is recognized that loads 26 including other arrangements of concentrated windings are envisioned as being usable with embodiments of the present invention, and thus the winding arrangements of FIGS. 3A and 3B are merely exemplary.

Figure 4:
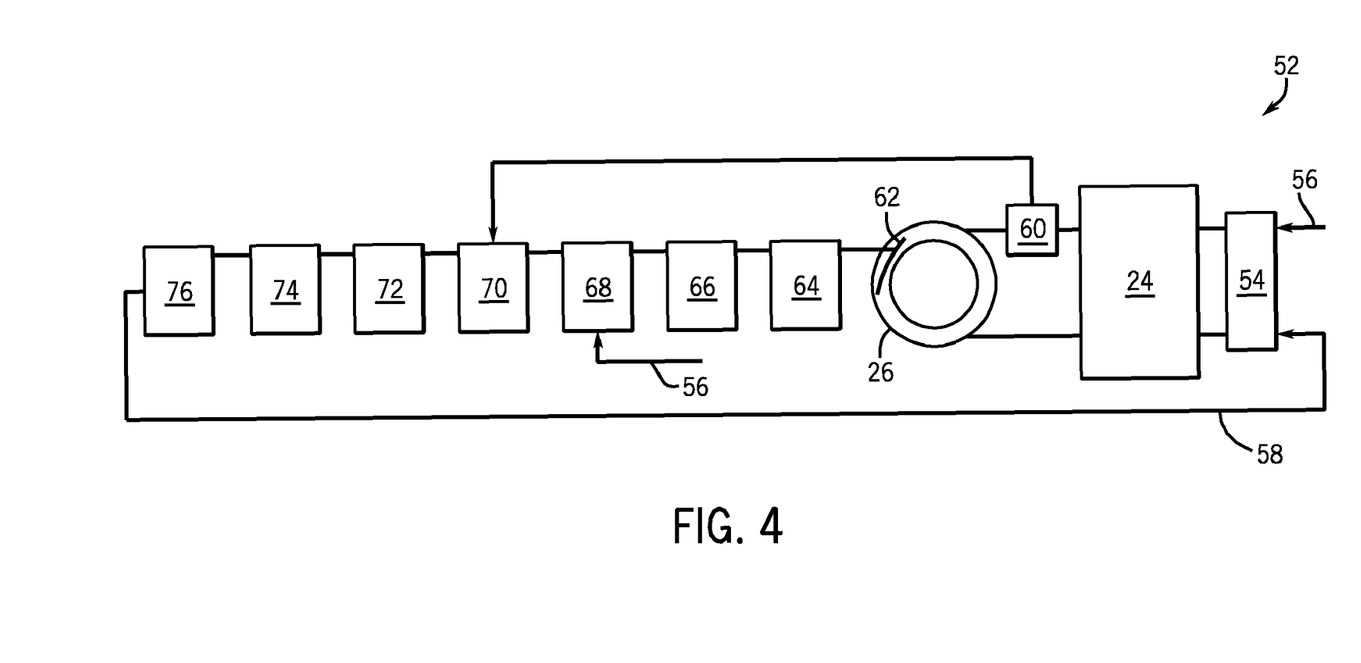
FIG. 4 is a flow diagram of a controller implemented technique for controlling an AC motor drive according to an embodiment of the invention.

Referring now to FIG. 4, a block diagram is shown representative of a control scheme 52 for operating motor drive 10 (FIG. 2) that is implemented, for example, by controller 28 (FIG. 2). The control scheme 52 of FIG. 4 performs electronic processing details (EPD) used together with the electrical machine 26 having fractional-slot concentrated stator windings 42 (FIGS. 3A and 3B) to achieve high power density, high efficiency, and reduced cost of both the electrical machine 26 and the inverter 24. That is, control scheme 52 is implemented in order to generate instantaneous non-sinusoidal current commands that will produce rotating air gap fields with only fundamental components and eliminate all field harmonics, thus resulting in the best energy conversion from the stator to the rotor, i.e. high torque at high efficiency.

Initially, BLOCK 54 of control scheme 52 performs a selective "synchronization time function" operation on a received first input current 56 and received second input current 58. The first input current 56 is an initial or test current input that is input into BLOCK 54 from a power source (not shown) and is in the form of a sinusoidal calculated current demand. The initial/test sinusoidal current demand is calculated, for example, based on an input from an operator requesting a desired torque to be generated by electrical machine 26. In an initial iteration, or test/setup run, second input current 58 is absent.

The initial/test sinusoidal current demand of first input 56 passes through BLOCK 54 unaffected (i.e., no time synchronization performed on first input 56) to represent the sinusoidal current demand to the inverter 24. Responsive to the initial/test sinusoidal current demand, inverter 24 produces or generates an initial current that is output therefrom. The initial output current is passed to BLOCK 60, which functions to adjust an amplitude of the current according to the initial sinusoidal current demand so as to produce a rotating magnetic field (that meets the torque requirement) in the air gap of the electrical machine 26 (i.e., in the air gap between rotor 36 and stator 38, FIGS. 3A and 3B) that can be easily detected, as will be explained below. The adjustment factor added by BLOCK 60 is then stored for later use.

The current output from BLOCK 60 is applied to the machine terminals of electrical machine 26, which responsive thereto, produces a rotating magnetic field in the air gap. The rotating magnetic field generated by electrical machine 26 is detected, for example, by using high temperature Hall probes 62 integrated into electrical machine 26, or alternatively by using search coils (not shown) located preferably at the center of the stator. The output of the search coils/Hall probes is transmitted to BLOCK 64 and is received thereby (i.e., received by controller) as feedback on a strength of the air gap magnetic field. A fast Fourier transform (FFT) is performed on the air gap magnetic field feedback at BLOCK 64 to determine/analyze the fundamental component and the harmonic components of the air gap rotating field. That is, instantaneous values of the fundamental component and the harmonic components of the air gap rotating field are determined.

Values for the instantaneous fundamental component and the instantaneous harmonic components of the air gap rotating field determined in BLOCK 64 are passed to BLOCK 66, which acts to eliminate the harmonic components of the air gap magnetic field. The fundamental component of the air gap magnetic field is thus isolated and is subsequently passed to BLOCK 68. As shown in FIG. 4, the isolated instantaneous fundamental component of the air gap magnetic field is input to BLOCK 68 along with the first input 56 (i.e., the initial sinusoidal current demand). A lookup table is stored in BLOCK 68 that has stored therein a plurality of sinusoidal input current demands and the ideal fundamental component of a rotating magnetic field generated from each of the plurality of sinusoidal input current demands. The "ideal" fundamental component of the rotating magnetic field associated with each sinusoidal input current demand is defined in the lookup table as the highest fundamental component generated by input of the sinusoidal input current demand to an electrical machine having sinusoidal windings.

The isolated instantaneous fundamental component of the air gap magnetic field and the initial sinusoidal current demand of the first input are analyzed/compared to the lookup table in BLOCK 68. More specifically, the instantaneous fundamental component of the air gap magnetic field and the initial sinusoidal current demand are analyzed with respect to the lookup table to determine what current demand need be applied to an electrical machine having sinusoidal windings in order to generate the instantaneous fundamental component of the air gap magnetic field. Based on this determination, a correction is applied to the instantaneous fundamental component of the rotating magnetic field, such that the ideal fundamental component for the needed sinusoidal current demand is realized.

Referring still to FIG. 4, upon determination of the ideal fundamental component of the rotating magnetic field, the ideal fundamental component is input to BLOCK 70. Also in BLOCK 70, the adjustment factor previously applied to the initial sinusoidal current demand in BLOCK 60 is removed, by having an input from BLOCK 60 to BLOCK 70 to cancel the adjustment done earlier. A "true" signal is thus output from BLOCK 70 and received by BLOCK 72. At BLOCK 72, a Laplace transform is performed on the signal from BLOCK 70.

BLOCK 74 represents the Laplace transfer function of the fractional-slot concentrated winding in the electrical machine. The transfer function of BLOCK 74 is obtained between the current input to the electrical machine terminal and the rotating magnetic field as measured by the search coils/Hall probes. This is measured over the full speed range of the electrical machine using standard small signal perturbation techniques, as known in the control industry. The Laplace transform of the fractional-slot concentrated windings is between the output of the Hall search coils/Hall probes, which is the fundamental component of the air gap magnetic field, and the input signal, which is the fundamental of the input current demand.

The output of BLOCK 72, which is the Laplace transfer of the instantaneous air gap magnetic field, is considered to be the input of BLOCK 74, which is the transfer function of the fractional-slot concentrated winding. Next, at BLOCK 76, the inverse Laplace transform is applied to the output of BLOCK 74 to re-construct the exact instantaneous low voltage current waveform that, when applied to the inverter, will produce the desired instantaneous current. A desired current waveform for generating the ideal fundamental component of the rotating magnetic field is thus determined from BLOCKS 72, 74, and 76. Based on the desired current waveform, an instantaneous non-sinusoidal current demand is generated that will produce the desired current waveform when applied to the inverter.

As shown in FIG. 4, the instantaneous non-sinusoidal current demand generated from BLOCK 76 is sent to BLOCK 54 as second input current 58. BLOCK 54 zeroes the sinusoidal first input current 56 and performs a synchronization time function operation on second input current 58 from the power source (not shown), which adjusts the timing of the second input current. The adjusted (i.e., instantaneous) non-sinusoidal current demand is then sent to inverter 24, thereby causing the inverter to output a non-sinusoidal current that causes electrical machine 26 to generate a rotating magnetic field having the ideal fundamental component. The ideal fundamental component of the rotating magnetic field causes electrical machine 26 to produce high torque with minimum losses, as harmonics are eliminated.

Figure 5:
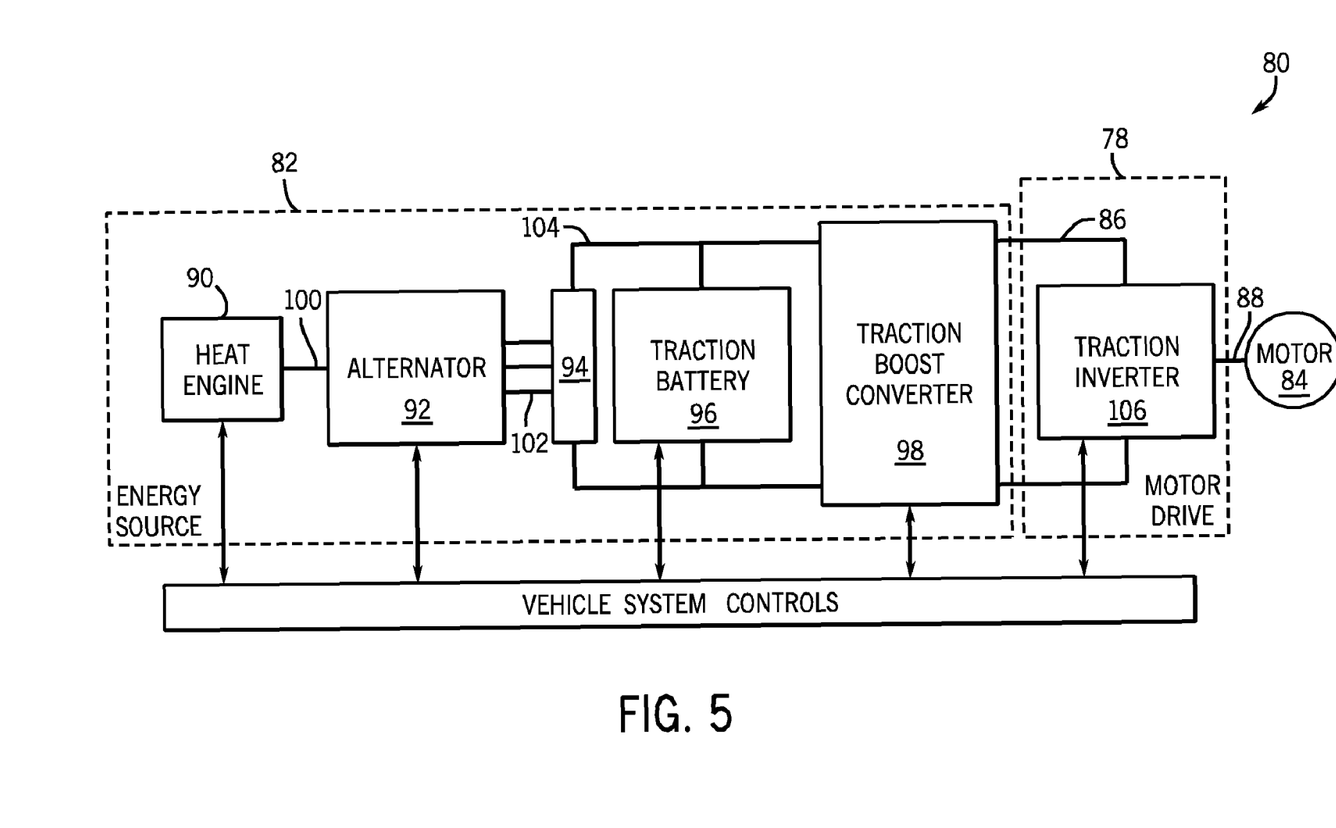
FIG. 5 is a block schematic diagram of an apparatus for producing tractive effort incorporating a motor drive according to an embodiment of the invention.

Referring now to FIG. 5, a motor drive 78 implementing a control scheme/electronic processing as described in FIG. 4 is shown as incorporated into a hybrid electric vehicle (HEV) AC propulsion system 80 that produces tractive effort, according to an embodiment of the invention. In the embodiment of FIG. 5, motor drive 78 receives a DC power or voltage as an input. Propulsion system 80 includes motor drive 78, an energy source 82, and a motor 84 configured as an AC motor having fractional-slot concentrated windings, or tooth windings. In operation, energy source 82 generates a high DC voltage 86. Motor drive 78 generates a motor voltage 88 from high DC voltage 86, and motor 84 produces tractive effort from motor voltage 88. As used herein, motor 84 refers to an AC motor capable of producing mechanical power from electrical power including, without limitation, single phase or multiple phase AC motors.

In the embodiment of FIG. 5, energy source 82 is configured as a hybrid-electric energy source that comprises a heat engine 90, an alternator 92, a rectifier 94, a traction/energy battery 96, and a traction boost converter 98. Traction boost converter 98 is sometimes referred to as bi-directional DC-DC converter, or a bi-directional boost/buck converter that functions to decouple the voltage between the input and the output of the device while efficiently transferring power. In operation, heat engine 90 generates mechanical power 100 by burning a fuel. Alternator 92 generates an alternating voltage 102 from mechanical power 100 and rectifier 94 then rectifies alternating voltage 102 to produce a low DC voltage 104. Energy battery 96 stores and delivers energy derived from low DC voltage 104, and traction boost converter 98 boosts low DC voltage 104 to produce high DC voltage 86. As used herein in reference to DC voltages, "low" and "high" are relative terms only and imply no particular absolute voltage levels. The high DC voltage 86 is transferred to motor drive 78, which includes therein a traction converter 106 (i.e., inverter) that receives high DC voltage 86 and, responsive thereto, generates motor voltage 88 from high DC voltage 86 during motoring operation. Additionally, traction converter 106 generates high DC voltage 86 from motor voltage 88 during braking operation. During a braking operation, the high DC voltage 86 is produced from motor voltage 88 and the power flow is from the high voltage side 86 of the bi-directional DC-DC converter 98 to the lower voltage side 104 of the bi-directional DC-DC converter 98 through a "buck" mode of operation.

In operation, motor drive 78 generates an initial sinusoidal current demand (i.e., a first input) responsive to a requested torque output of AC motor 84. As set forth in detail with respect to FIG. 4, motor drive 78 (i.e., a controller in motor drive 78) transmits the initial sinusoidal current demand to traction inverter 106 to produce an initial current for transmission to AC motor 84. AC motor generates a rotating magnetic field responsive to the initial sinusoidal current demand, from which motor drive 78 determines fundamental and harmonic components. The harmonic components of the air gap magnetic field are eliminated and motor drive 78 applies a correction to the fundamental component to generate an ideal fundamental component. An instantaneous current needed to generate the ideal fundamental component in AC motor 84 and an exact instantaneous low voltage current waveform that when applied to the traction inverter 106 will produce the needed instantaneous current, are determined by motor drive 78. Based on the desired current waveform, motor drive 78 generates an instantaneous non-sinusoidal current demand that will produce the desired current waveform when applied to the traction inverter 106. Traction inverter 106 therefore generates motor voltage 88 having a desired current waveform based on the instantaneous non-sinusoidal current demand from motor drive 78.

While motor drive 78 and an accompanying electrical machine (i.e., AC motor 84) are described in FIG. 5 as being incorporated into a HEV AC propulsion system 80 that produces tractive effort, it is recognized that a motor drive configured to implement a technique for exciting an electrical machine with instantaneous non-sinusoidal current waveforms is also applicable to other varied types of electrical machines. Thus, embodiments of the invention directed to motor drives and motor drive controllers are applicable to electrical machines in numerous industrial, commercial, and transportation industries.

A technical contribution for the disclosed method and apparatus is that it provides for a controller implemented technique for exciting an electrical machine with instantaneous non-sinusoidal current waveforms. A control scheme is implemented that processes an initial sinusoidal current command applied to the inverter in order to generate instantaneous non-sinusoidal current commands that will produce rotating air gap fields with only fundamental components and eliminate all field harmonics, thus resulting in the best energy conversion from the stator to the rotor, i.e. high torque at high efficiency.

Therefore, according to one embodiment of the invention, a motor drive is provided having an input connectable to a power source and an output connectable to an input terminal of an electrical machine having a plurality of fractional-slot concentrated windings. The motor drive includes an inverter having a plurality of switches therein to control current flow and terminal voltages in the electrical machine and a controller connected to the inverter and programmed to input an initial sinusoidal current demand to the inverter, thereby causing the inverter to output an initial sinusoidal input current. The controller is also programmed to receive feedback on an air gap magnetic field in the electrical machine generated by the initial sinusoidal current demand, determine an instantaneous fundamental component and instantaneous harmonic components of the air gap magnetic field, and apply a correction to the instantaneous fundamental component of the air gap magnetic field to generate an ideal fundamental component. The controller is further programmed to generate a non-sinusoidal current demand based on the ideal fundamental component and input the non-sinusoidal current demand to the inverter, thereby causing the inverter to output a non-sinusoidal current.

According to another embodiment of the invention, a method for exciting an electrical machine having a plurality of fractional-slot concentrated windings is provided. The method includes the steps of inputting a test sinusoidal current demand to an inverter and generating an initial sinusoidal current waveform in the inverter in response to the test sinusoidal current demand, the initial sinusoidal current waveform being output to the electrical machine to generate a rotating magnetic field between a rotor and a stator included therein. The method also includes the steps of determining a fundamental component and harmonic components of the rotating magnetic field, determining an ideal fundamental component for the air rotating magnetic field from the test sinusoidal current demand and the fundamental component, and determining a desired current waveform based on the ideal fundamental component. The method further includes the steps of generating a non-sinusoidal current demand based on the desired current waveform and inputting the non-sinusoidal current demand to the inverter, thereby causing the inverter to output a non-sinusoidal current waveform to the electrical machine to generate a sinusoidal rotating magnetic field.

According to yet another embodiment of the invention, a motor drive controller for applying current commands to an inverter to control current flow and terminal voltages in an electrical machine is provided. The motor drive controller is configured to input an initial sinusoidal current demand to the inverter, thereby causing the inverter to output an initial sinusoidal input current. The motor drive controller is also configured to receive an input signal including data on an instantaneous rotating magnetic field generated in the electrical machine responsive to the initial sinusoidal current demand, determine an instantaneous fundamental component and instantaneous harmonic components of the instantaneous rotating magnetic field, and identify an ideal fundamental component for the rotating magnetic field based on the initial sinusoidal current demand and the instantaneous fundamental component. The motor drive controller is further configured to generate an instantaneous non-sinusoidal current demand based on the ideal fundamental component and input the instantaneous non-sinusoidal current demand to the inverter, thereby causing the inverter to output a non-sinusoidal current that causes the electrical machine to generate a rotating magnetic field having the ideal fundamental component.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A motor drive having an input connectable to a power source and an output connectable to an input terminal of an electrical machine having a plurality of fractional-slot concentrated windings, the motor drive comprising:
    an inverter having a plurality of switches therein to control current flow and terminal voltages in the electrical machine; and
    a controller connected to the inverter and programmed to:
        receive feedback on an air gap magnetic field in the electrical machine generated by an initial sinusoidal current;
        generate a non-sinusoidal current demand based on the received air gap magnetic field feedback; and
        input the non-sinusoidal current demand to the inverter, thereby causing the inverter to output a non-sinusoidal current.

2. The motor drive of claim 1 wherein the controller is further programmed to apply an adjustment factor to the initial sinusoidal input current to modify an amplitude thereof; and
    remove the adjustment factor upon generation of the non-sinusoidal current.

3. The motor drive of claim 1 wherein the controller is further programmed to:
    determine an instantaneous fundamental component and instantaneous harmonic components of the air gap magnetic field; and
    apply a correction to the instantaneous fundamental component of the air gap magnetic field to generate an ideal fundamental component.

4. The motor drive of claim 3 wherein the controller is further programmed to perform a fast Fourier transform (FFT) on the air gap magnetic field feedback to determine the instantaneous fundamental component and instantaneous harmonic components.

5. The motor drive of claim 3 wherein the controller is further programmed to eliminate the instantaneous harmonic components of the air gap magnetic field feedback.

6. The motor drive of claim 3 wherein the controller is further programmed to:
    access a lookup table having stored therein an ideal fundamental component of an air gap magnetic field associated with each of a plurality of sinusoidal input current demands, the ideal fundamental component comprising a highest fundamental component for each of the plurality of sinusoidal input current demands;
    compare the instantaneous fundamental component associated with the initial sinusoidal current demand with the ideal fundamental component associated with the initial sinusoidal current demand; and
    apply the correction to the instantaneous fundamental component to generate the ideal fundamental component.

7. The motor drive of claim 3 wherein the controller is further programmed to perform a Laplace transfer function of the instantaneous air gap magnetic field, the Laplace transfer function of the instantaneous air gap magnetic field derived from the initial sinusoidal input current and the ideal fundamental component of the air gap magnetic field.

8. The motor drive of claim 3 wherein the controller is further programmed to:
    perform a Laplace transfer function of the fractional-slot concentrated windings of the electrical machine, the Laplace transfer function of the fractional-slot concentrated windings derived from the initial sinusoidal input current and the instantaneous fundamental component of the air gap magnetic field; and
    apply the Laplace transfer function of the instantaneous air gap magnetic field to the Laplace transfer function of the fractional-slot concentrated windings.

9. The motor drive of claim 8 wherein the controller is further programmed to perform an inverse-Laplace transfer function of the fractional-slot concentrated windings of the electrical machine to determine the non-sinusoidal current demand, the non-sinusoidal current demand causing the inverter to output a non-sinusoidal current needed to generate the ideal fundamental component of the air gap magnetic field.

10. The motor drive of claim 9 wherein controller is further programmed to adjust a timing of an input current from the power source according to the non-sinusoidal current demand to produce the non-sinusoidal current output from the inverter.

11. The motor drive of claim 1 wherein the electrical machine comprises one of a permanent magnet machine, an induction machine, a synchronous reluctance machine, and a switched reluctance machine.

12. The motor drive of claim 1 wherein the controller is further programmed to input an initial sinusoidal current demand to the inverter, thereby causing the inverter to output the initial sinusoidal input current.

13. A method for exciting an electrical machine having a plurality of fractional-slot concentrated windings, the method comprising:
    inputting a test sinusoidal current demand to an inverter;
    generating an initial sinusoidal current waveform in the inverter in response to the test sinusoidal current demand, the initial sinusoidal current waveform being output to the electrical machine to generate a rotating magnetic field between a rotor and a stator included therein;
    determining characteristics of the rotating magnetic field;
    determining a desired current waveform based on the determined characteristics of the rotating magnetic field;
    generating a non-sinusoidal current demand based on the desired current waveform; and inputting the non-sinusoidal current demand to the inverter, thereby causing the inverter to output a non-sinusoidal current waveform to the electrical machine to generate a sinusoidal rotating magnetic field.

14. The method of claim 13 wherein determining characteristics of the rotating magnetic field further comprises:
   determining a fundamental component and harmonic components of the rotating magnetic field; and
   determining an ideal fundamental component for the air rotating magnetic field from the test sinusoidal current demand and the fundamental.

15. The method of claim 14 wherein determining the fundamental component and harmonic components comprises:
   detecting the rotating magnetic field via one of a search coil and a plurality of Hall effect sensors; and
   applying a fast Fourier transform (FFT) to the detected rotating magnetic field to identify the fundamental component and harmonic components.

16. The method of claim 14 wherein determining an ideal fundamental component of the rotating magnetic field comprises accessing a lookup table having stored therein each of a plurality of sinusoidal input current demands and ideal fundamental components of a rotating magnetic field generated from each of the plurality of sinusoidal input current demands, each ideal fundamental component representing a highest fundamental component resulting from input of a sinusoidal input current demand to an electrical machine having sinusoidal windings.

17. The method of claim 14 wherein determining the desired current waveform comprises determining a current needed to generate the ideal fundamental component of the rotating magnetic field.

18. The method of claim 14 wherein generating the non-sinusoidal current demand comprises generating a non-sinusoidal current demand to adjust a timing of an input current to produce the desired current waveform, thereby causing the inverter to output a non-sinusoidal current waveform that causes the electrical machine to generate a rotating magnetic field having the ideal fundamental component.

19. The method of claim 14 further comprising eliminating the harmonic components of the rotating magnetic field to isolate the fundamental component.

20. The method of claim 13 further comprising modifying an amplitude of the initial sinusoidal current waveform to generate a test rotating magnetic field in the electrical machine.

21. A motor drive controller for applying current commands to an inverter to control current flow and terminal voltages in an electrical machine, the motor drive controller configured to:
   input an initial sinusoidal current demand to the inverter, thereby causing the inverter to output an initial sinusoidal input current;
   receive an input signal including data on an instantaneous rotating magnetic field generated in the electrical machine responsive to the initial sinusoidal current demand;
   determine characteristics of the instantaneous rotating magnetic field;
   generate an instantaneous non-sinusoidal current demand based on the desired current waveform; and
   input the instantaneous non-sinusoidal current demand to the inverter, thereby causing the inverter to output a non-sinusoidal current that causes the electrical machine to generate a rotating magnetic field having an ideal fundamental component.

22. The motor drive controller of claim 21 being further configured to:
   determine the characteristics of the instantaneous rotating magnetic field by being programmed to:
   determine an instantaneous fundamental component and instantaneous harmonic components of the instantaneous rotating magnetic field;
   identify the ideal fundamental component for the rotating magnetic field based on the initial sinusoidal current demand and the instantaneous fundamental.

23. The motor drive controller of claim 22 being further configured to access a database having stored thereon each of a plurality of sinusoidal input current demands and ideal fundamental components of a rotating magnetic field generated from each of the plurality of sinusoidal input current demands, each ideal fundamental component representing a highest fundamental component resulting from input of a sinusoidal input current demand to an electrical machine having sinusoidal windings.

24. The motor drive controller of claim 21 being further configured to determine a modified current needed to determine the ideal fundamental component of the rotating magnetic field.

25. The motor drive controller of claim 24 being further configured to:
   zero the initial sinusoidal input current; and
   adjust a timing of an input current according to the non-sinusoidal current demand to produce the modified current.

* * * * *